United States Patent [19]

Heili

[11] 3,863,382

[45] Feb. 4, 1975

[54] DIVING PLANE FOR FISHING LURES

[76] Inventor: Dean H. Heili, 502 Waldo Blvd., Manitowoc, Wis. 54220

[22] Filed: Oct. 23, 1973

[21] Appl. No.: 408,820

[52] U.S. Cl. ............................................ 43/43.13
[51] Int. Cl. .......................................... A01k 95/00
[58] Field of Search ................................. 43/43.13

[56] References Cited
UNITED STATES PATENTS

| | | | |
|---|---|---|---|
| 2,716,832 | 9/1955 | Minnie III | 43/43.13 X |
| 3,007,659 | 11/1961 | Zachary | 43/43.13 U X |
| 3,466,787 | 9/1969 | Collins | 43/43.13 |
| 3,667,148 | 6/1972 | Dawson | 43/43.13 |

Primary Examiner—Louis G. Mancene
Assistant Examiner—Daniel J. Leach
Attorney, Agent, or Firm—Andrus, Sceales, Starke & Sawall

[57] ABSTRACT

A diving plane includes a metal vane of generally triangular configuration having a pair of diverging channels. A wire bail, mounted above the vane, is bent to form a pair of knees. The bail has a bight at its rear end. The bait or lure is fastened to the rear of the bail or diving plane. The trolling line is slidably fastened to the bail for movement between the knees and the bight as the vane assumes the various positions in the water necessary for sinking the bait and retrieving the diving plane, both with and without a fish.

26 Claims, 6 Drawing Figures

PATENTED FEB 4 1975

DIVING PLANE FOR FISHING LURES

BACKGROUND OF THE INVENTION

Field of the Invention

The present invention relates to line attached bodies for use in fishing and more specifically to diving planes for drawing fishing tackle to the depths at which fish feed.

SUMMARY

Numerous food and game fish, including various species of salmon and trout, feed at substantial depths, typically 50–200 feet. In order to take these fish with a hook, it is necessary to lower the baited hook or lure to such feeding depths.

While this may be accomplished by sinkers, the use of these weights tends to be difficult and ineffective, particularly since trolling is the usual fishing method. As a result, devices have been developed which draw fishing tackle to fishing depths by hydrodynamic action. The present invention is directed to such a device, commonly termed a diving plane.

The diving plane of the present invention includes a metal vane of generally triangular configuration having a pair of diverging channels. A wire bail, mounted above the vane, is bent to form a pair of knees. The bail has a bight at its rear end. The bait or lure is fastened to the rear end of the bail or diving plane. The trolling line is slidably fastened to the bail for movement between the knees and the bight as the vane assumes the various positions in the water necessary for sinking the bait and retrieving the diving plane, both with and without a fish.

Among the advantages of the diving plane of the present invention is a high degree of hydrodynamic efficiency resulting in both steep angle of descent for the trolling line and a minimum of turbulence. The steep angle of descent increases the depth to which the line may be driven and lessens the amount of line needed to attain a given depth. With the lesser amount of trolling line, the fish will strike closer to the boat and the radius in which the trolling boat may be turned without tangling the lines is reduced.

The efficiency of the diving plane of the present invention avoids the need for weights, either in the plane or as separate sinkers, and permits the use of lighter rods, reels, and line, all of which improve the sporting action of fishing by trolling.

The diving plane is highly stable and thus runs true behind the boat. The diving plane may be rigged to intentionally draw the line to one side or the other so as to permit a number of trolling lines behind the boat. The absence of shimmy or wobble in the diving plane avoids any interference with the action of the lure.

The diving plane of the present invention automatically surfaces when a fish takes the lure associated with the diving plane. In the event of a short strike, loss of the fish, or bumping the bottom, the diving plane resumes the diving position, either of its own accord or upon command from the fisherman. It may be easily retrieved at the conclusion of fishing.

The diving plane of the present invention is simple in design and construction and requires no adjustments, setting of trip mechanisms, or the like, for use.

DESCRIPTION OF THE PREFERRED EMBODIMENT

Figure 1:
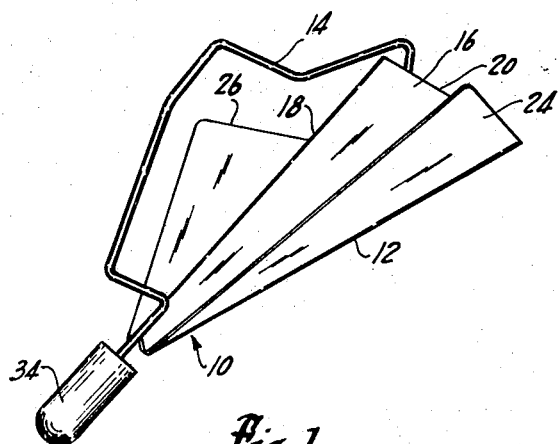
FIG. 1 is a perspective view of the diving plane of the present invention.
Figure 2:
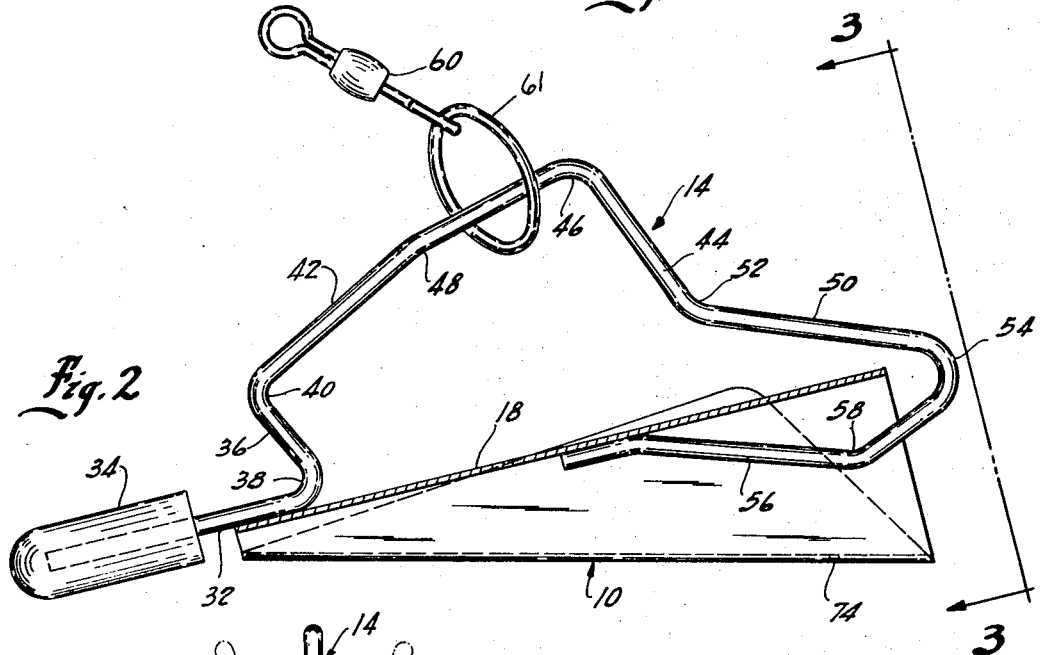
FIG. 2 is a side view of the diving plane of the present invention.

Turning now to the drawing, there is shown in FIG. 1, diving plane 10 of the present invention comprised of vane or blade 12 and bail 14.

Figure 3:
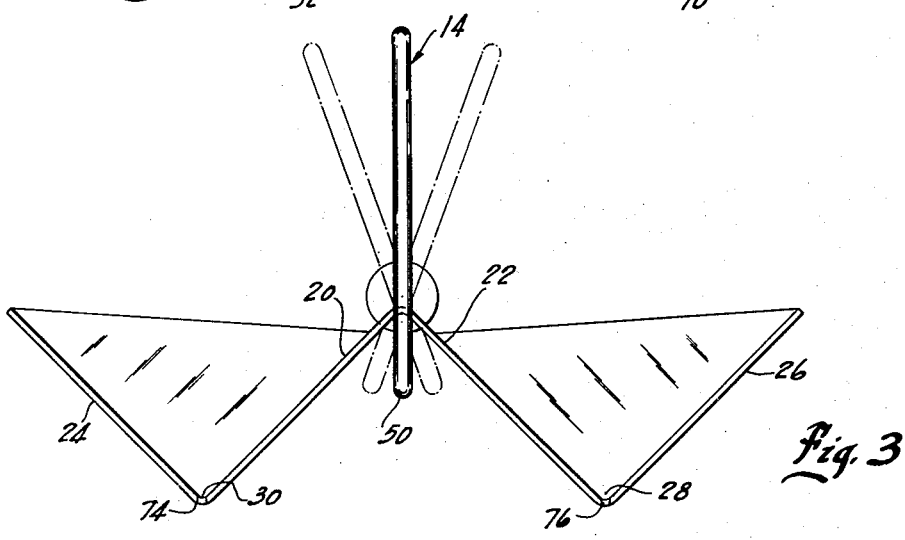
FIG. 3 is a back view of the diving plane of the present invention.

Vane 12 may be formed of a single piece of metal or other suitable material bent or folded to the desired configuration. Vane 12 includes medial portion 16 having central ridge 18 from which depend triangular sides 20 and 22. Sides 20 and 22 may be in the shape of the planar right triangles shown in FIG. 1 in which the base, lying along ridge 18, is several times larger than the height. As shown in FIG. 3, the angle between sides 20 and 22 subtends an angle of approximately 90°.

Vane 12 is further bent or folded to provide upstanding flanges 24 and 26 along each of the edges of medial portion 16. Flanges 24 and 26 may also be of planar triangular configuration and have dimensions similar to the triangular sides 20 and 22 of medial portion 16. The hypotenuses of the sides and flanges are joined at creases 28 and 30 and the adjacent sides and flanges subtend angles of approximately 90°, as shown in FIG. 3.

Vane 12 thus includes a pair of V-shaped diverging channels formed by the medial portion sides 20 and 22 and flanges 24 and 26. The channels diverge from a pointed end of the vane which is forward when diving plane 10 is in a canted diving position, hereinafter described, to a flared rear end.

Vane 12 may also be formed with curving medial portion sides and flanges, in which case the pair of diverging channels are U-shaped rather than V-shaped. The 90° angular relationship of the sides and flanges may exist between tangents of the upper edges of the sides and flanges.

The use of 90° angles between the sides and flanges has been found to be highly desirable, although the present invention is not limited to such a configuration. With angles greater than 90°, diving plane 10 tends to become unstable, resulting in wobbling, flutter, and an inability to track straight. Angles less than 90° reduce the diving surface. No increase in stability or tracking ability is noted at these smaller angles.

Bail 14 may be formed of a single piece of bent wire or rod for receiving a swivel 60 and ring 61 or other means for coupling trolling line 62 to diving plane 10. Bail 14 also includes ring 68 for receiving leader 70 for the fishing lure. Bail 14 has an extension 32 coupled to the forward end of ridge 18, as through resistance welding or the like, and extending beyond the end of vane 12. Weight 34 is fastened to the forward portion of vane 12, as by casting lead about the wire of bail 14.

Extension 32 is joined to a forward upstanding portion 36 of bail 14 through acute angle 38. The upper end of upstanding portion 36 is bent through knee 40 to central portion 42. Knee 40, termed in the claims, the "second knee," subtends an angle of approximately 90°. Rear upstanding portion 44 joins the rear end of central portion 42 through knee 46 which may also subtend approximately 90°. Knee 46 is termed in the claims the "first knee." Central portion 42 slopes downward toward the forward end of diving plane 10 above ridge 18 and contains shallow bend 48.

The lower end of rear upstanding portion 44 is joined to upper arm 50 through obtuse angle 52. Upper arm 50 is bent through bight 54 to lower arm 56. Bight 54 is positioned behind, and in approximate alignment with, the rear end of central ridge 18. A third knee 58 is provided in lower arm 56. The end of arm 56 is coupled to vane 12 on the underside of central ridge 18.

In operation, trolling line 62 is tied to swivel 60. Lure 66 is attached to ring 68 on bail 14 by leader 70. An attractor 72 may be interposed in leader 70, if desired.

Figure 4:
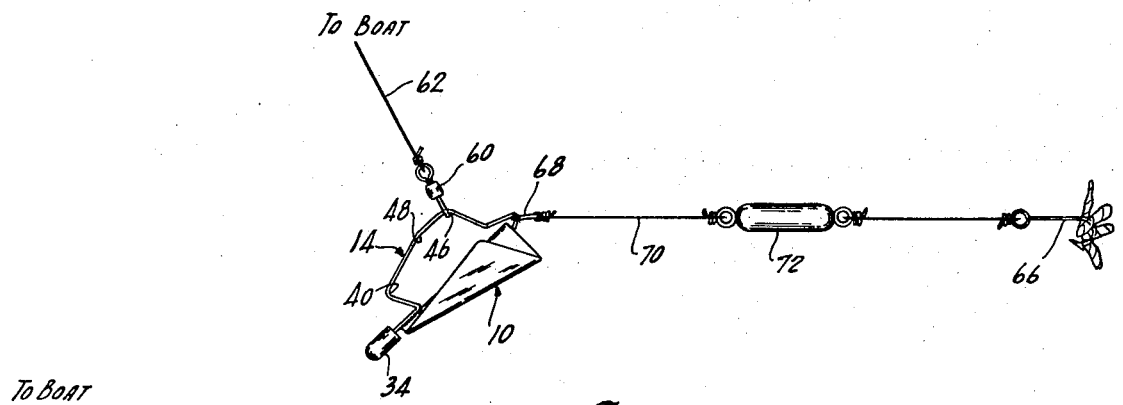
FIG. 4 is a side view of the diving plane of the present invention in the diving position with the attached fishing tackle.

Ring 61 is moved to knee 46 of bail 14. This will normally occur automatically as diving plane 10 is suspended from trolling line 62. When so suspended, diving plane 10 will be in a slightly nose down position, due to weight 34. Bend 48 assists in retaining swivel 60 in knee 46 or the adjacent part of central portion 42. The diving plane is then lowered over the side of a moving boat. Upon immersion, diving plane 10 assumes the more pronounced nose down position, shown in FIG. 4, which brings the hydrodynamic and mechanical forces exerted on the plane into equilibrium. This position is such as to exert a strong downward pull on trolling line 62 which draws the line off a supply reel in the boat and down into the water.

Trolling line 62 is payed off the supply reel until lure 66 is at the desired depth. Thereafter, diving plane 10 will hold the lure at this depth as the boat moves through the water. At great depths, bend 52 helps to stabilize the diving plane without undesirable release.

When a fish takes lure 66, the retarding action thus applied to diving plane 10 causes ring 61 to move from knee 46 over bend 48 to knee 40. With the force of trolling line 62 exerted from knee 40, diving plane 10 assumes the nose up position shown in FIG. 5 so that the fish is brought readily to the surface. However, when in this position, the diving plane will not interfere with the natural fighting characteristics of the fish.

In the event the fish strikes short or escapes, ring 61 will, in most instances, return to knee 46 as diving plane 10 resumes the nose down position. This retains the lure at fishing depth and eliminates undesirable surfacing of the lure or the necessity of returning it to the boat for resetting. The same is true should diving plane 10 strike bottom.

to intentionally retrieve diving plane 10 at the conclusion of fishing, trolling line 62 is rapidly payed out, allowing the line to go slack. The slackness in trolling line 62 causes diving plane 10 to assume a vertical attitude and to begin to fall nose downward. This causes swivel 60 to move from knee 46 to bight 54. The slack is then removed from trolling line 62. Diving plane 10 now assumes the upside down position shown in FIG. 6. The action of the diving plane under these conditions is such as to cause it to ascend to the surface, responsive to movement of the boat, facilitating the reeling in of trolling line 62 and retrieval of the diving plane and lure.

From the foregoing, it will be apparent that the improved operation of diving plane 10 is dependent, at least in part, on the configuration of bail 14. To this end, knee 46 is longitudinally located along central ridge 18 at a point which applies the mechanical force of trolling line 62 so as to obtain the desired diving angle in diving plane 10. The exact longitudinal location is determined by the desired diving angle, the configuration of vane 12, and the size of weight 34. Knee 46 is located above central ridge 18 a distance which facilitates movement of ring 61 into and out of the knee and which avoids the instabilities which may arise when knee 46 is too close to the central ridge.

Figure 5:
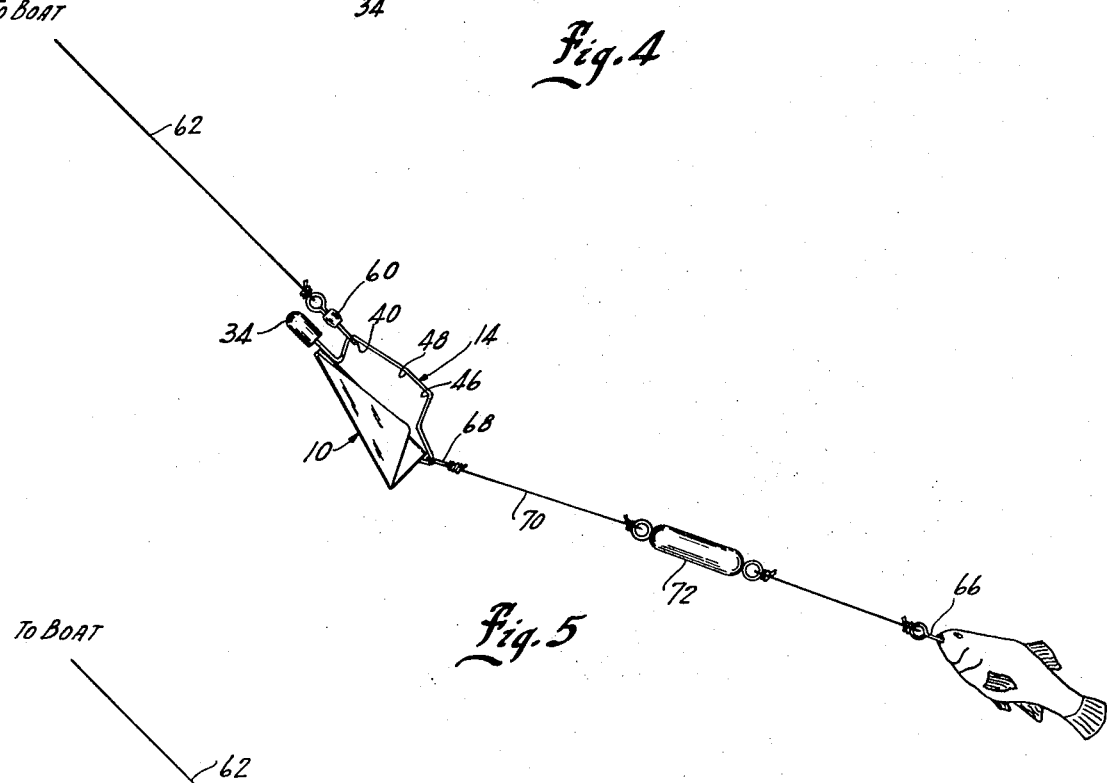
FIG. 5 is a side view of the diving plane of the present invention showing the diving plane in the position in which it surfaces with a fish on the lure.

Knee 40 is located along central ridge 18 at a point which both assists in raising the diving plane when ring 61 is located in knee 40, as shown in FIG. 5, and facilitates return of the ring to the knee 46 in the event of loss of the fish or a short strike.

Figure 6:
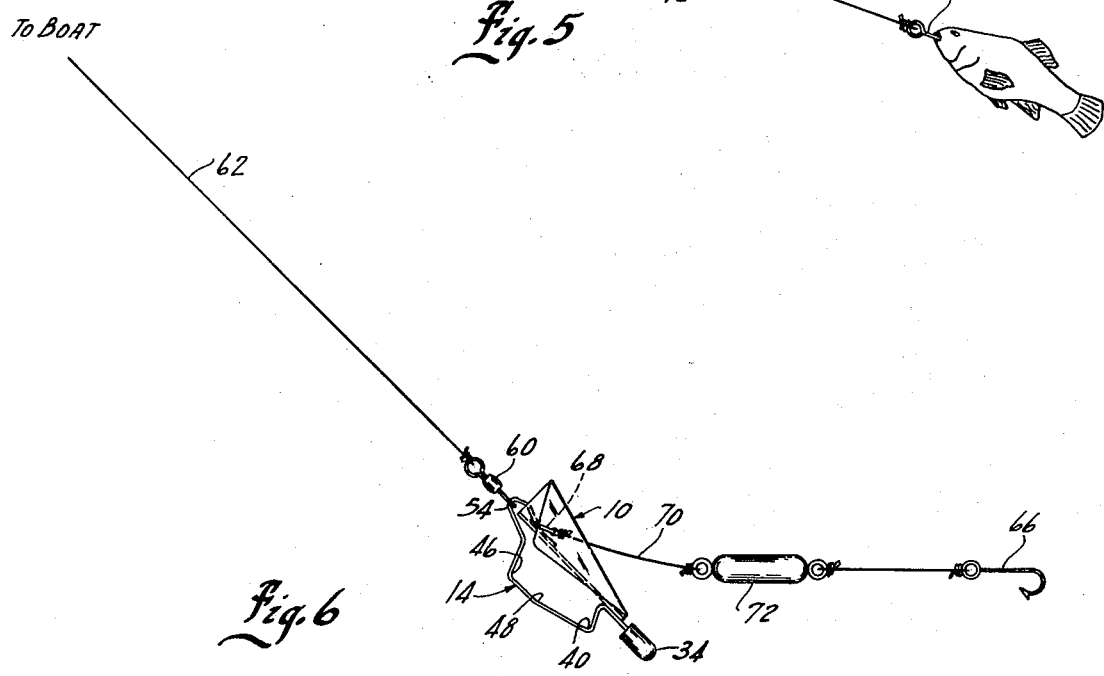
FIG. 6 is a side view of the diving plane of the present invention showing the diving plane in the retrieving position.

The size of obtuse angle 52 is selected so as to assure deliberate tripping of diving plane 10 into the retrieved position shown in FIG. 6, while preventing accidental tripping. If the angle is too large, the diving plane will trip to the retrieving position too easily while with too small an angle it will be difficult to intentionally trip diving plane 10 into the proper position when retrieval is desired. An angle of about 135° has been found to be satisfactory.

While the relative movement of water with respect to diving plane 10 is customarily obtained by the movement of a trolling boat through the water, the relative movement may also be obtained by lowering the diving plane into a moving body of water, such as a stream.

If it is desired to have diving plane 10 provide some lateral displacement of the trolling line in addition to the vertical displacement, leader 70 may be fastened off the center line of diving plane 10, as for example in hole 74 or 76 shown in FIG. 3. This results in a longitudinal rotation of diving plane to move to the left or right when in operation. The same may be accomplished by rotating bail 14 along the longitudinal axis of diving plane 10, as shown in dotted lines in FIG. 3.

Various modes of carrying out the invention are contemplated as being within the scope of the following claims particularly pointing out and distinctly claiming the subject matter which is regarded as the invention.

I claim:

1. A diving plane suitable for connection to a trolling line for drawing the line to a desired water depth upon relative movement of the plane and water by assuming a downwardly canted diving position, said diving plane comprising:

a rigid vane having a pointed end which is forward when said plane is in the canted diving position, a flared rear end and a pair of channels diverging from said forward end towards said rear end, said channels being formed from a medial portion having a pair of arcuately disposed, generally triangularly shaped sides depending from a common ridge, and an upright arcuately disposed generally triangular shaped flange joined to each side of said medial portion; and an elongated, rod like bail fastened to said vane for slidably receiving the trolling line, said bail having a central portion located above said vane and sloping downward toward said forward pointed end, said rod being bent to form a first knee at the rear end of said central portion for receiving the trolling line where the diving plane is in the downwardly canted diving position and a second knee at the forward end of said central portion positioned rearwardly of said forward end of said vane for receiving said trolling line when said diving plane is in an upwardly canted surfacing position.

2. The diving plane according to claim 1 wherein said bail has forward and rear upstanding portions located above said vane and positioning said central portion above said medial portion, said upstanding portions being joined to said central portion at said knees.

3. The diving plane according to claim 2 wherein said rear upstanding portion is joined to one of a pair of arms having an intermediate bight, said bight being positioned beyond and embracing the rear end of said vane for receiving said trolling line when said diving plane is in an upside down retrieving position.

4. The diving plane according to claim 3 wherein said bight portion includes a third knee in the other of said pair of arms.

5. The diving plane according to claim 4 wherein said forward upstanding portion is joined to said vane adjacent said forward end and the other of said pair of arms is fastened to said medial portion beyond said third knee.

6. The diving plane according to claim 5 wherein said bight is located in general alignment with said rear edge of said medial portion and wherein said third knee is located beneath said ridge.

7. The diving plane according to claim 1 wherein the position of said first knee along said central ridge is selected to cause said diving plane to assume the most efficient downwardly canted diving position.

8. The diving plane according to claim 1 wherein the height of said first knee above said central ridge is selected to facilitate the movement of said trolling line into and out of said knee while avoiding unstable operation of said diving plane.

9. The diving plane according to claim 1 wherein said central portion of said bail includes a bend for assisting in retaining said trolling line in said first knee when said diving plane is in the diving position.

10. The diving plane according to claim 9 wherein the downward slope of central portion is sufficient to cause the tension in the trolling line to urge the trolling line into said first knee.

11. The diving plane according to claim 2 wherein said first and second knees subtend angles of approximately 90°.

12. The diving plane according to claim 3 wherein said rear upstanding portion is joined to the one of said arms at an obtuse angle.

13. The diving plane according to claim 12 wherein the magnitude of said obtuse angle is selected to prevent accidental movement of the trolling line from said first knee to said bight while permitting similar intentional movement of the trolling line.

14. The diving plane according to claim 12 wherein the magnitude of said obtuse angle is approximately 135°.

15. The diving plane according to claim 1 including a weight affixed to the forward end of said vane.

16. The diving plane according to claim 1 wherein said bail is further defined as suitable for receiving a fishing tackle leader.

17. The diving plane according to claim 1 wherein said vane includes means for receiving a fishing tackle leader.

18. The diving plane according to claim 17 wherein said receiving means is located out of alignment with said ridge.

19. The diving plane according to claim 18 wherein said receiving means is located at the juncture of said medial portion and said flanges.

20. The diving plane according to claim 1 wherein the central portion of said bail is positioned in vertical alignment with said central ridge.

21. The diving plane according to claim 1 wherein said central portion of said bail is displaced out of vertical alignment with said central ridge.

22. The diving plane according to claim 1 wherein sides and flanges are plane triangles.

23. The diving plane according to claim 22 wherein said sides and flanges form generally right triangles, the common joinder of said sides and flanges lying on the hypotenuses of said triangles.

24. The diving plane according to claim 22 wherein the arcuate disposition of said sides is approximately 90° and the arcuate disposition of each of said flanges from the adjoining side is approximately 90°.

25. The diving plane according to claim 1 wherein said sides and said flanges are curved to form a pair of U-shaped channels.

26. The diving plane according to claim 25 wherein tangents of the upper edges of said U-shaped channels are arcuately disposed of approximately 90°.

* * * * *